US011207716B2

(12) United States Patent
Mantravadi et al.

(10) Patent No.: US 11,207,716 B2
(45) Date of Patent: Dec. 28, 2021

(54) COMPRESSOR WATER WASH SYSTEM

(71) Applicant: General Electric Company, Schenectady, NY (US)

(72) Inventors: Karthik Mantravadi, Karnataka (IN); Srinivas Avishetti, Karnataka (IN); Shubhra Bhatnagar, Karnataka (IN); Laxmikant Merchant, Taylors, SC (US); Joshua Adam Bagwell, Taylors, SC (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 16/158,340

(22) Filed: Oct. 12, 2018

(65) Prior Publication Data

US 2019/0111458 A1 Apr. 18, 2019

(30) Foreign Application Priority Data

Oct. 12, 2017 (IN) ............................ 201741036270

(51) Int. Cl.

*B08B 9/00* (2006.01)
*B08B 3/02* (2006.01)
*F01D 25/00* (2006.01)
*F02C 7/04* (2006.01)

(52) U.S. Cl.

CPC .................. *B08B 9/00* (2013.01); *B08B 3/02* (2013.01); *F01D 25/002* (2013.01); *F02C 7/04* (2013.01)

(58) Field of Classification Search

None

See application file for complete search history.

(56) References Cited

U.S. PATENT DOCUMENTS

| | | | | |
|---|---|---|---|---|
| 4,046,155 | A * | 9/1977 | Mansson | B08B 3/02 134/167 R |
| 7,033,135 | B2 * | 4/2006 | Mortzheim | F01D 9/065 415/115 |
| 7,670,440 | B2 | 3/2010 | Asplund et al. | |

(Continued)

FOREIGN PATENT DOCUMENTS

| | | | |
|---|---|---|---|
| CA | 2713479 C | * | 8/2010 |
| DE | 2641425 | * | 3/1978 |

(Continued)

*Primary Examiner* — Jason Y Ko

(74) *Attorney, Agent, or Firm* — Fletcher Yoder, P.C.

(57) ABSTRACT

A system includes a fluid distribution system. The fluid distribution system includes a first water wash nozzle configured to spray a wash fluid into an intake flow received through a bell mouth of a compressor during operation of the compressor in a water wash mode. The first water wash nozzle includes a first inlet end coupled to the bell mouth of the compressor, a first tip disposed opposite the first inlet end, and a first body of the first water wash nozzle extending from the first inlet end to the first tip toward an axis of the compressor. The first water was nozzle further includes a first outlet disposed at the first tip and configured to spray a first portion of the wash fluid into the intake flow during operation of the compressor in the water wash mode and a second outlet disposed along the first body and configured to spray a second portion of the wash fluid into the intake flow during operation of the compressor in the water wash mode.

21 Claims, 6 Drawing Sheets

(56) References Cited

U.S. PATENT DOCUMENTS

2007/0028947 A1* 2/2007 Erickson ............... F01D 25/002 134/22.18
2009/0320440 A1 12/2009 Erickson et al.
2012/0279523 A1* 11/2012 de la Bruere-Terreault ................ F04D 29/705 134/23

FOREIGN PATENT DOCUMENTS

DE 10254721 A1 6/2004
EP 1882823 A2 * 1/2008

* cited by examiner

AIR
FLUID SUPPLY SYSTEM 70
69
58
80
97
93
66
64
50
82
90
96
94
56
66
90
88
91
66
90
98
92
90
52
50
52
54
102
100

COMPRESSOR WATER WASH SYSTEM

TECHNICAL FIELD

The subject matter disclosed herein relates to gas turbine systems, and more specifically to a water wash system of a compressor of the gas turbine system.

BACKGROUND

Gas turbine systems typically include a gas turbine engine having a compressor, a combustor, and a turbine. Air may be compressed in the compressor and combined with fuel to create a fuel-air mixture. The fuel-air mixture may be fed into the combustor, where the air-fuel mixture may be combusted to produce hot pressurized exhaust gas. The pressurized exhaust gas may be passed through the turbine causing the turbine blades to rotate, thus generating an output of the gas turbine system. Fluid injection into the intake of air at the compressor inlet may increase the efficiency and output of the gas turbine system by removing impurities from the compressor blades.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fluid distribution system. The fluid distribution system includes a first water wash nozzle configured to spray a wash fluid into an intake flow received through a bell mouth of a compressor during operation of the compressor in a water wash mode. The first water wash nozzle includes a first inlet end coupled to the bell mouth of the compressor, a first tip disposed opposite the first inlet end, and a first body of the first water wash nozzle extending from the first inlet end to the first tip toward an axis of the compressor. The first water wash nozzle further includes a first outlet disposed at the first tip and configured to spray a first portion of the wash fluid into the intake flow during operation of the compressor in the water wash mode and a second outlet disposed along the first body and configured to spray a second portion of the wash fluid into the intake flow during operation of the compressor in the water wash mode.

In a second embodiment, a system includes a fluid distribution system. The fluid distribution system includes multiple water wash nozzles disposed about a bell mouth of a compressor. The multiple water wash nozzles are configured to spray a wash fluid into an intake flow received through the bell mouth during operation of the compressor in a water wash mode. Each water wash nozzle of the multiple water wash nozzles includes an inlet end coupled to the bell mouth of the compressor, a tip disposed opposite the inlet end, and a body extending from the inlet end to the tip toward an axis of the compressor. Each water wash nozzle of the multiple water wash nozzles further includes two outlets, wherein each outlet is configured to spray a portion of the wash fluid into the intake flow during operation of the compressor in the water wash mode, and wherein at least one of the outlets is disposed along the body.

In a third embodiment, a system includes a fluid distribution system. The fluid distribution system includes multiple retractable water wash nozzles configured to spray a wash fluid into an intake flow received through a bell mouth of a compressor during operation of the compressor in a water wash mode. The multiple retractable water wash nozzles are disposed circumferentially about an axis of the compressor, and each retractable water wash nozzle of the multiple water wash nozzles is coupled to the bell mouth of the compressor. Each retractable water wash nozzle of the multiple water wash nozzles is configured to extend from the bell mouth in an extended position during operation of the compressor in the water wash mode, and is configured to retract into the bell mouth in a retracted position during operation of the compressor in other modes.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles “a,” “an,” “the,” and "said" are intended to mean that there are one or more of the elements. The terms "comprising," "including," and "having" are intended to be inclusive and mean that there may be additional elements other than the listed elements.

As discussed above, the output of a gas turbine system may be the rotation of the turbine blades, and in turn the rotation of the shaft of the turbine. The turbine blades may rotate when hot pressurized exhaust gas is passed through the turbine from the combustor. The combustor may combust a fuel-air mixture to create the hot pressurized exhaust gas. Fuel for the fuel-air mixture may be injected into the combustor through fuel nozzles, where it may mix with compressed air from the compressor. The compressor may receive air from an air intake and compress the air through a series of compressor blades. The output and efficiency of the gas turbine system may be increased through injection of a fluid (e.g., water wash) into the intake of air that is fed into the compressor to clean the blades within the compressor.

With the foregoing in mind, the disclosed embodiments may include a fluid distribution system. Specifically, the fluid distribution system may be utilized for online water wash procedures in the compressor of the gas turbine system. The fluid distribution system may include a number of water wash nozzles disposed circumferentially around the inlet to the compressor. Further, the water wash nozzles may be configured to be retractable such that they are extended into the path of the intake air flow only when in use for water wash. The disclosed embodiments of the water wash nozzles may increase the coverage of the compressor blades by the fluid spray based at least in part on the circumferential configuration of the water wash nozzles, the multiple outlets of one or more of the water wash nozzles, or any combination thereof.

Figure 1:
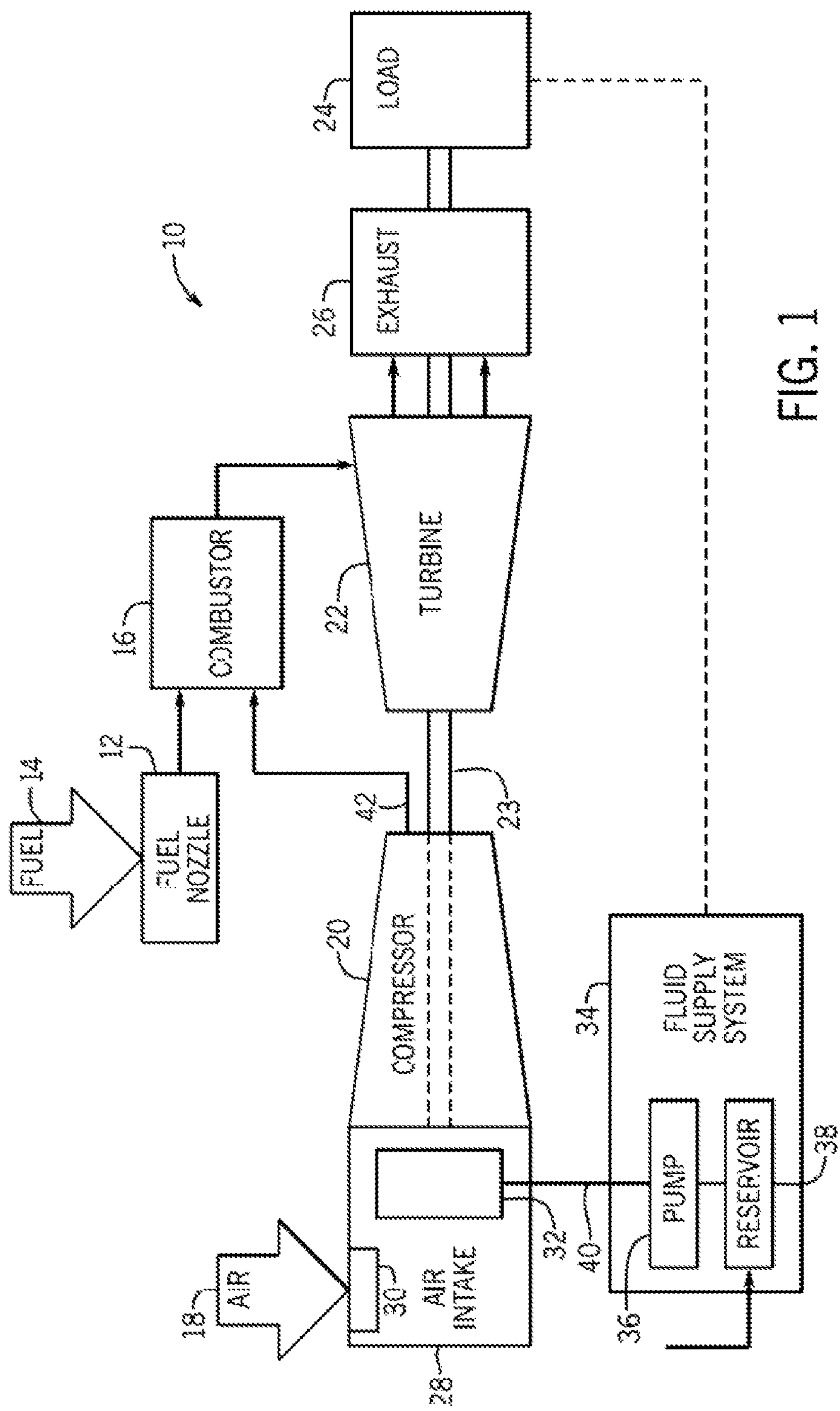
FIG. 1 is a block diagram of an embodiment of a gas turbine system having a fluid distribution system, in accordance with embodiments of the present disclosure.

Turning now to the drawings and referring first to FIG. 1, a block diagram of a gas turbine system 10 is illustrated. The diagram includes fuel nozzles 12, fuel 14, and combustor 16. As depicted, fuel 14 (e.g., a liquid fuel, a gas fuel), such as natural gas, is routed to the gas turbine system 10 through fuel nozzles 12 into combustor 16. The fuel 14 combines with compressed air 42 from the compressor 20. The compressor 20 produces the compressed air 42 from an intake air flow 18 that is compressed in the compressor 20. The combustor 16 ignites and combusts the air-fuel mixture, and then directs hot pressurized exhaust gas into a turbine 22. The exhaust gas passes through blades of the turbine 22 causing the turbine shaft 23 to rotate, thus creating the power output of the gas turbine system 10. The turbine shaft 23 may be coupled directly or indirectly to one or more components (e.g., compressor 20, load 24, fluid supply system 34) throughout the gas turbine system 10. Eventually, the exhaust gases of the combustion process may exit the gas turbine system 10 via an exhaust outlet 26.

The intake air 18 may enter the compressor 20 through an air intake 28 upstream of the compressor 20. The air intake 28 may include a filter 30 that processes (e.g., filters) the intake air flow 18. A fluid distribution system 32 may be located within the air intake 28 upstream of the inlet of the compressor 20. The fluid distribution system 32 is configured to inject a fluid, such as water, into the intake air flow 18 as it enters the compressor 20. Fluid may be supplied to the fluid distribution system 32 by a fluid supply system 34. The fluid supply system 34 may include a pump 36 and a reservoir 38. The fluid may be pumped from the reservoir 38 by the pump 36 and supplied to the fluid distribution system 32 via a fluid supply line 40. The fluid supplied to the fluid distribution system 32 may be any fluid desired to be injected into the intake air flow 18 at the entrance to the compressor 20, such as water, water with added detergent, or any other fluid. In some embodiments, as the intake air flow 18 enters into the compressor 20, the fluid droplets from the fluid distribution system 32 may be carried by the intake air flow 18 into the compressor 20. Within the compressor 20, the fluid droplets may contact the blades of the compressor 20, thus cleaning and removing impurities from the blades.

Figure 2:
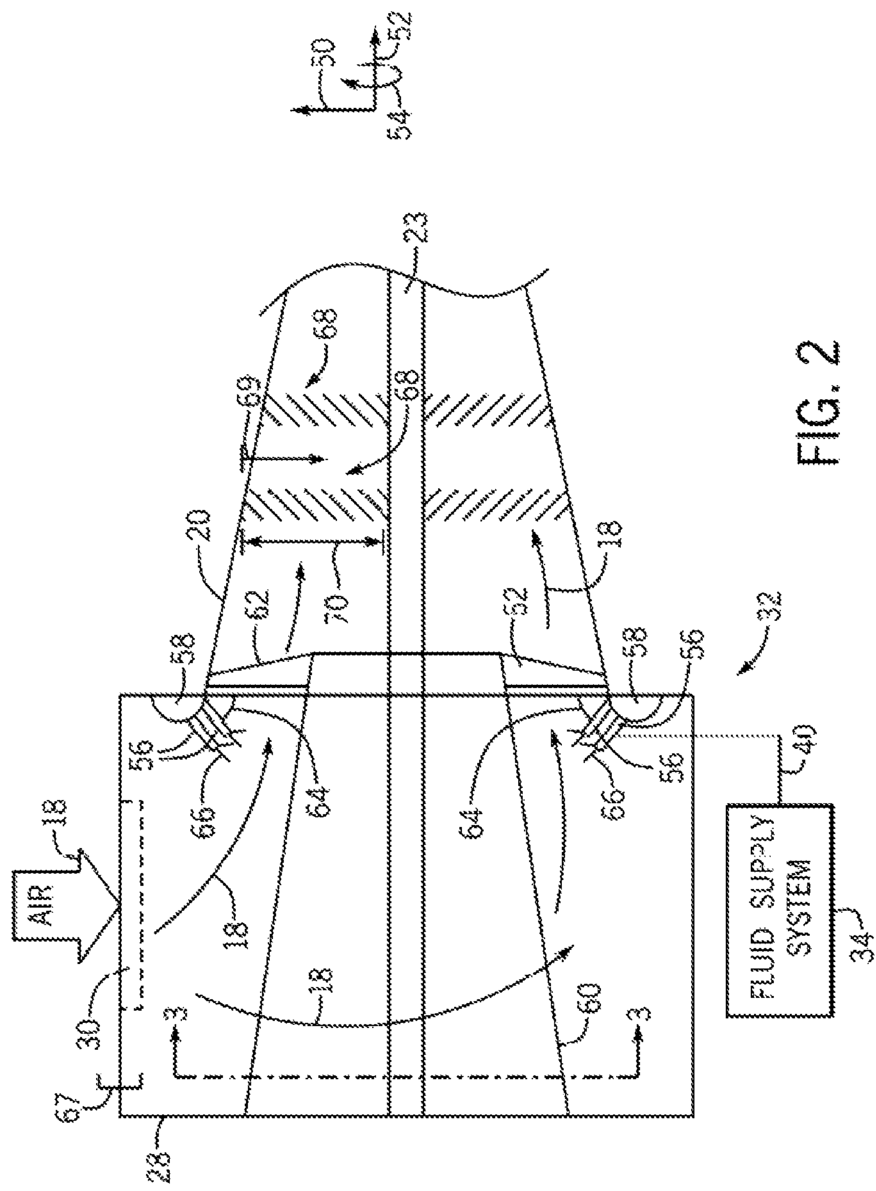
FIG. 2 is a radial cross-section view of an embodiment of the fluid distribution system of FIG. 1, in accordance with an embodiment of the present disclosure.

FIG. 2 is a radial section view of an embodiment of the fluid distribution system 32 within the air intake 28. The fluid distribution system 32 may be positioned within the air intake 28 upstream of the compressor 20, disposed on or adjacent to a bell mouth 58 at the inlet to the compressor 20, or any combination thereof. To facilitate discussion, the fluid distribution system 32 and its components may be described with reference to a radial axis or direction 50, an axial axis or direction 52, and a circumferential axis or direction 54. The fluid distribution system 32 may include multiple spray nozzles 56 configured to distribute or inject the supplied fluid from the fluid supply system 34 into the passing intake air flow 18 that flows through the bell mouth 58 of the compressor 20. In some embodiments, the spray nozzles 56 may be circumferentially 54 disposed about axis 52 and on the bell mouth 58. The spray nozzles 56 may be coupled to the bell mouth 58 or any other area of the inlet casing of the compressor 20 that may be suitable to position the spray nozzles 56 in the path of the intake air flow 18 as it enters the compressor 20. Further, the spray nozzles 56 may point toward a shroud 60 located within the air intake 28. The shroud 60 is configured to distribute the intake air flow 18 throughout the air intake 28 before the intake air flow 18 enters the compressor 20. The shroud 60 may extend at least partially into the compressor 20. The compressor 20 and the shroud 60 may be connected by multiple struts 62 near the inlet to the compressor 20. In some embodiments, the shaft 23 extends through the middle of the compressor 20, the shroud 60, or any combination thereof.

The fluid distribution system 32 may include any quantity (e.g., 2, 3, 4, 5, 6, 7, 8, 9, or more) of spray nozzles 56. In some embodiments, the spray nozzles 56 may be airfoil shaped, which may enable a reduction the pressure drop and flow unsteadiness of the intake air flow 18 as it enters the compressor 20. However, the spray nozzles 56 may be any shape configured to extend from the bell mouth 58, such as rectangular or oval. The spray nozzles 56 may be circumferentially 54 disposed at multiple axial locations about the bell mouth 58 and the axis 52 of the compressor 20. The spray nozzles 56 may be coupled to the bell mouth 58, a manifold of the fluid distribution system 32, or any combination thereof. The spray nozzles 56 may point toward the shroud 60 and the shaft 23, such that the spray nozzles 56 may extend into the path of the intake air flow 18 as it enters into the compressor 20. In some embodiments, each spray nozzle 56 may be positioned such that the spray nozzle 56 may be extended at an angle 64 (e.g., 90°, 45°, 30°) from an axis 50 at the inlet of the compressor 20 that may run from one side of the bell mouth 58 of the compressor 20 to the opposite side of the bell mouth 58. However, in some embodiments, the spray nozzles 56 may extend from the bell mouth 58 at an angle parallel with the axis 50 such that the spray nozzles 56 are positioned directly between the air intake 28 and the compressor 20 at the inlet to the compressor 20. In some embodiments, all of the spray nozzles 56 may be positioned at the same angle 64 relative to the axis 50 at the inlet to the compressor 20. However, in some embodiments, the spray nozzles 56 may be positioned at different angles 64 (e.g., 90, 75, 60, 45, 30, or 15 degrees) from the axis 50 at the inlet to the compressor 20.

The spray nozzles 56 may have multiple outlets configured to spray the supplied fluid into the intake air flow 18 to be carried into the compressor 20. Each spray nozzle 56 may have any quantity (e.g., 1, 2, 3, 4, or more) outlets. The outlets may be disposed at the tip of the spray nozzle 56, along the upstream surface of the spray nozzle 56, along the downstream surface of the spray nozzle 56, or any combination thereof, as discussed in greater detail with reference to FIG. 4. The outlets of the spray nozzles 56 may emit a fluid spray 66 that may be sprayed from the spray nozzles 56 into the intake air flow 18 as it passes the spray nozzles 56. In some embodiments, as the intake air flow 18 enters the air intake 28, it may flow around the shroud 60 and toward the compressor 20. The fluid spray 66 from the spray nozzles 56 mixes with the intake air flow 18 and is carried into the compressor 20. As the intake air 18 and the fluid droplets flow into the compressor 20, the droplets may interface with the blades 68 of the compressor 20. The intake air flow 18 and the fluid droplets received through a top portion 67 of the air intake 28 may be susceptible to gravitational and centrifugal forces that may cause relatively larger size fluid droplets received through the top portion 67 of the air intake 28 to migrate toward the shroud 60 and toward the periphery of the compressor 20. The fluid droplets received through the top portion 67 may interface with a washed portion 69 that is less than a length 70 (e.g. span) of the compressor blades 68 at the R1 stage (e.g., first stage) of the compressor 20. For example, fluid droplets received through the top portion 67 may interface with a washed portion 69 that is less than 85% of the length of the compressor blades 68 at the R1 stage of the compressor 20. The washed portion 69 represents a water wash coverage of the length 70 of the blades 68. However, embodiments of spray nozzles 56 discussed herein may increase the washed portion of the length of the compressor blades 68 at the R1 stage and subsequent stages of the compressor 20. For example, positioning of the spray nozzles 56 circumferentially about the bell mouth 58 at the inlet to the compressor 20 and the multiple outlets disposed on each spray nozzle 56 may enable a mitigation of the effects of the gravitational and centrifugal forces acting on the intake air flow 18 and the fluid droplets sprayed from the spray nozzles 56. This may enable an increase in the portion 69 washed by the fluid spray 66. In some embodiments, spray nozzles 56 with an optimum average droplet size between 85 to 111 micro meters may have a washed portion 69 that is greater than 85% of the length 70 of the R1 blades 68 at the first stage of the compressor 20. This in turn may enable an increase in efficiency and output of the gas turbine system 10.

Figure 3:
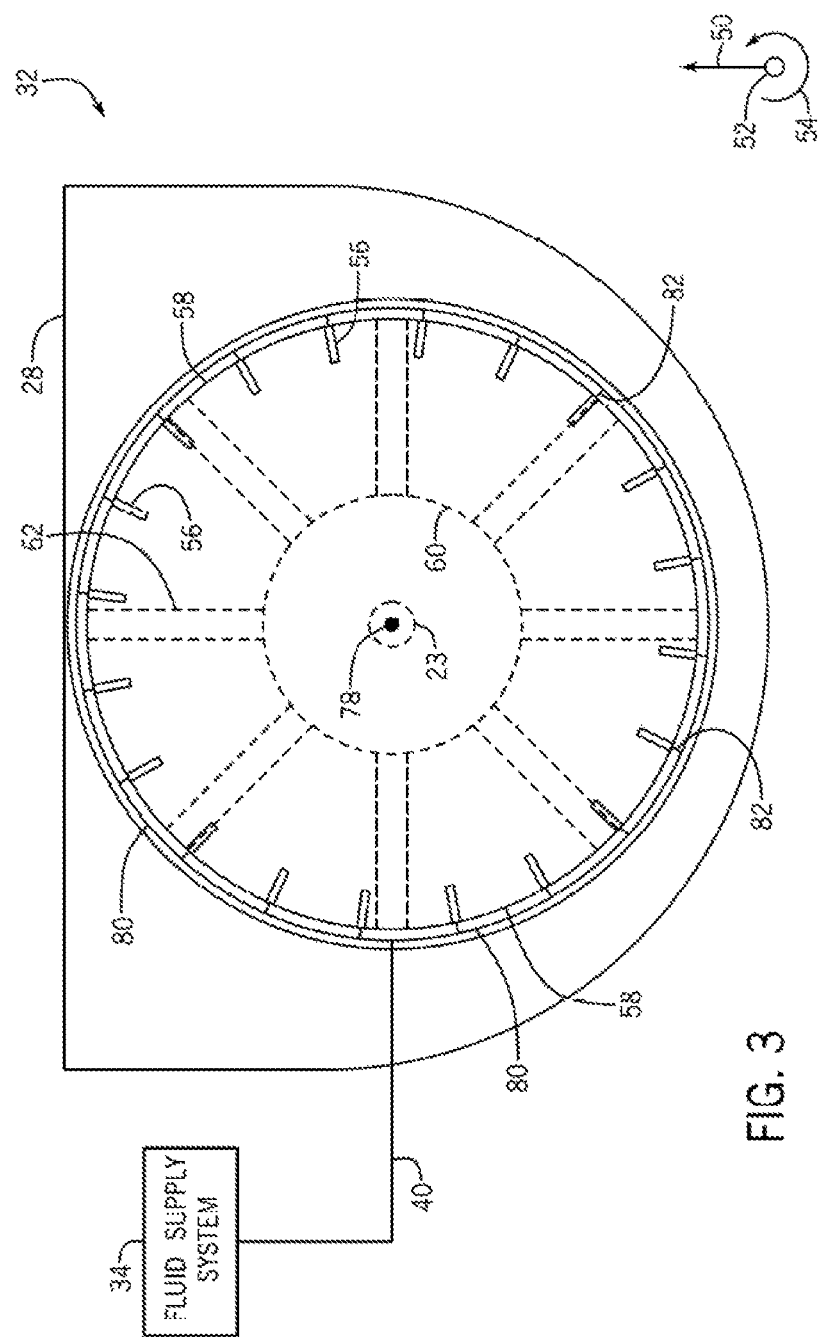
FIG. 3 is an axial cross-section view of an embodiment of the fluid distribution system of FIG. 2 take along line 3-3, in accordance with an embodiment of the present disclosure.

FIG. 3 is an axial cross-section view of an embodiment of the fluid distribution system 32 of FIG. 2 taken along line 3-3. In the illustrated embodiment, shown are the spray nozzles 56 extending into the path of the intake air flow 18 from the bell mouth 58 as viewed from inside the air intake 28 looking into the inlet of the compressor 20. As previously discussed, the fluid distribution system 32 may include any quantity of spray nozzles 56. In the illustrated embodiment, twenty spray nozzles 56 are shown extending from the bell mouth 58. However, there may be more or less spray nozzles 56 than the amount illustrated. For example, the fluid distribution system 32 may include 4, 9, 14, 19, or 24 spray nozzles. For reference, the struts 62 are illustrated. The struts 62 may couple to the bell mouth 58 of the compressor 20 and to the shroud 60. The spray nozzles 56 may be circumferentially 54 disposed about the bell mouth 58 and may extend from the bell mouth 58 into the path of the intake air flow 18 as it flows into the compressor 20. Further, in some embodiments, the spray nozzles 56 may be uniformly spaced circumferentially 54 about the bell mouth 58. However, in some embodiments, the spray nozzles 56 may not be uniformly spaced. Further, the circumferential 54 distribution of the spray nozzles 56 at the inlet to the compressor 20 may enable a greater portion 69 of the length 70 of the blades 68 of the compressor 20 to be interfaced by the fluid as it travels into the compressor 20 with the intake air flow 18. Further, in some embodiments, each of the spray nozzles 56 may point toward the same central location 78, such as the shaft 23 that runs through the middle of the compressor 20, the bell mouth 58, and the shroud 60, as in the illustrated embodiment. However, in some embodiments, the spray nozzles 56 may point to slightly different locations (e.g., locations along the axis 52) in order to achieve a desired fluid distribution downstream at the blades 68 of the compressor 20.

The spray nozzles 56 may be supplied with fluid from the fluid supply system 34. In the illustrated embodiment, the fluid may be directed from the fluid supply system 34 by the fluid supply line 40. In some embodiments, there may be a single fluid supply line 40 that supplies the fluid distribution system 32. However, there may be any quantity (e.g., 1, 2, 3, 4, or more) of fluid supply lines 40 that may direct fluid from one fluid supply system 34 or multiple fluid supply systems 34. The fluid supply line 40 may couple to one or more manifolds 80. Each manifold 80 may be configured to direct and distribute the fluid from the fluid supply line 40 circumferentially 54 around the bell mouth 58 to the locations where the spray nozzles 56 may be disposed. In some embodiments, one manifold 80 may be disposed circumferentially about the bell mouth 58 that may direct the fluid to all of the spray nozzles 56 of the fluid distribution system 32. However, in some embodiments, the fluid distribution system 32 may include any quantity (e.g., 1, 2, 3, or more) of the manifolds 80 that may each direct the fluid to one or more of the spray nozzles 56. From the manifold 80, the fluid may be directed to the spray nozzles 56 and the outlets of the spray nozzles 56 via nozzle supply lines 82. As in the illustrated embodiment, there may be a nozzle supply line 82 for each spray nozzle 56 of the fluid distribution system 32. However, in some embodiments, each nozzle supply line 82 may supply any multiple (e.g., 2, 3, 4, or more) of the spray nozzles 56. The nozzle supply lines 82 that may direct the fluid from the manifold 80 to one or more spray nozzles 56 may enable any or all of the spray nozzles 56 to be selected and supplied for use at a given time, such that the fluid spray 66 may be injected into the intake air flow 18 by any combination or all of the spray nozzles 56 at once. A selection of the spray nozzles 56 that are utilized for water wash procedures at a time may help enable achieving a desired distribution of the fluid spray 66 downstream and a desired portion 69 of the length 70 of the compressor blades at the R1 stage within the compressor.

Figure 4:
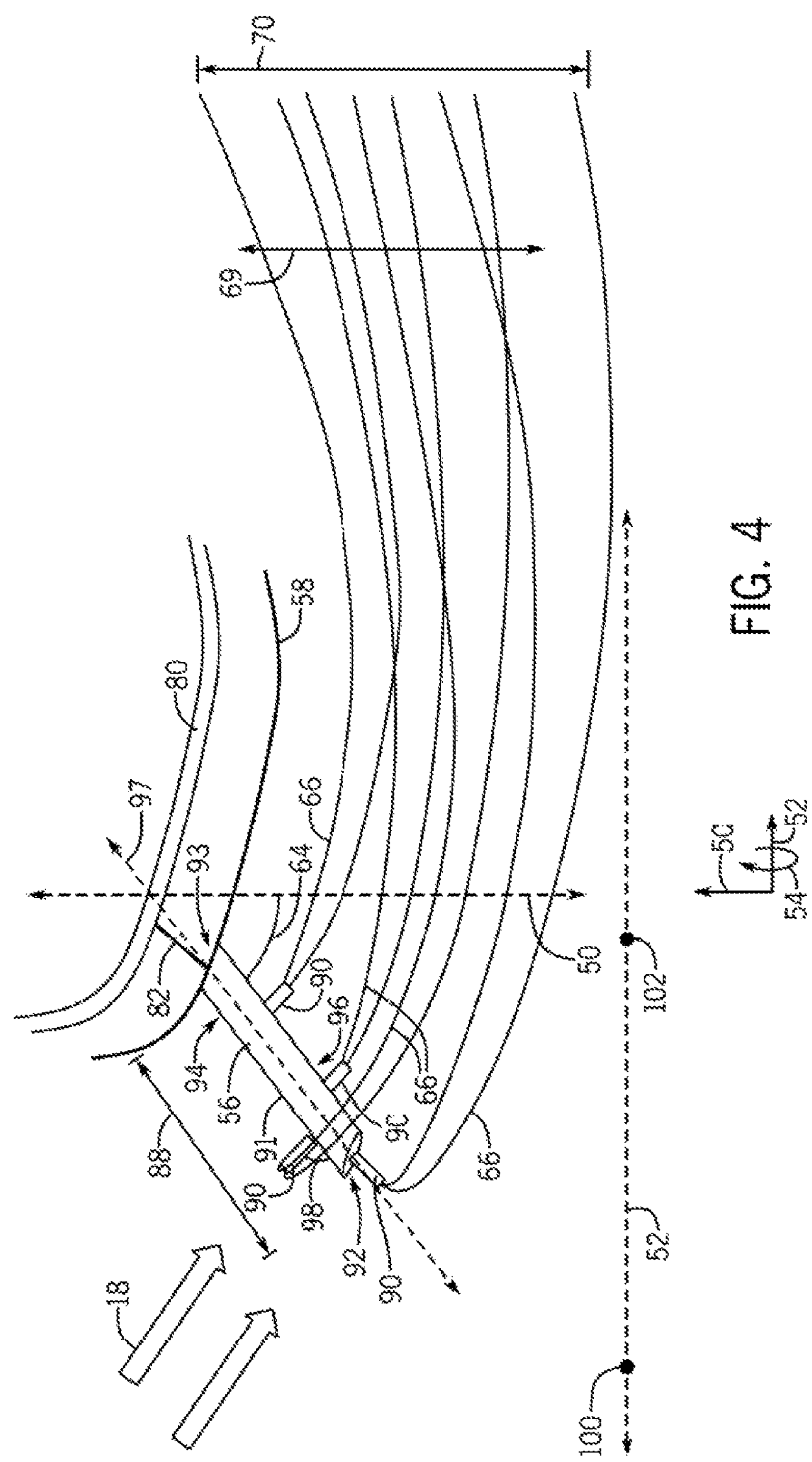
FIG. 4 is a perspective view of an embodiment of a spray nozzle of the fluid distribution system of FIG. 2, in accordance with an embodiment of the present disclosure.

FIG. 4 is a perspective view of an embodiment of a spray nozzle 56 of the fluid distribution system 32. The spray nozzles 56 may extend into the inlet space of the compressor 20 from the bell mouth 58 of the compressor 20. As previously discussed, there may be any quantity of spray nozzles 56 that may extend from the bell mouth 58. The spray nozzle 56 may have a length 88, which may be the length of extension of the spray nozzle 56 into the path of the intake air flow 18. In some embodiments, the length 88 of the spray nozzle 56 may be six inches. However, the spray nozzle 56 may be any length 88 (e.g., 1, 2, 3, 4, 5, 6, 7, 8, 9, 10, or more inches). In some embodiments, the spray nozzles 56 may be airfoil-shaped, which may enable a reduction in the pressure drop and flow unsteadiness of the intake air flow 18 as it enters the compressor 20. However, the spray nozzles may be any shape configured to extend into the path of the intake air flow 18, such as rectangular or oval. Further, as previously discussed, each spray nozzle 56 may be positioned such that it extends from the bell mouth 58 of the compressor 20 at the angle 64 (e.g., 90°, 45°, 30°) from the radial axis 50 at the inlet of the compressor that may run from one side of the bell mouth 58 of the compressor 20 to the opposite side of the bell mouth 58. However, in some embodiments, the spray nozzles 56 may extend from the bell mouth 58 at a position that may be perpendicular to the axis 52 of the compressor 20.

Each spray nozzle 56 may include one or more outlets 90 configured to spray the fluid into the intake air flow 18 to be carried into the compressor 20. Each spray nozzle 56 may include any quantity (e.g., 1, 2, 3, 4, 5, or more) of outlets 90. Each spray nozzle includes a body 91. The body 91 has an upstream surface 94 and a downstream surface 96, and is disposed between a tip 92 and an inlet end 93 of the spray nozzle 56. The outlets 90 may be disposed on one or more surfaces of the spray nozzles 56, including from the tip 92 of the spray nozzle 56, the upstream surface 94 of the spray nozzle 56, and the downstream surface 96 of the spray nozzle 56, or any combination thereof. Each outlet 90 of the spray nozzle 56 may be positioned at any angle 98 (e.g., 45°, 90°) relative to a center axis 97 of the spray nozzle 56. In some embodiments, one or more outlets 90 may be positioned parallel with the center axis 97 of the spray nozzle 56, such as an outlet 90 extending straight from the tip 92. In some embodiments, each outlet 90 of the spray nozzle 56 may be directed toward the same axial position along the axis 52 of the compressor 20. In some embodiments, the outlets 90 of the spray nozzle 56 may be directed toward different axial positions along the axis 52 of the compressor 20. For example, all of the outlets 90 of the spray nozzle 56 may be directed toward (e.g., point toward) a first axial position 100. In some embodiments, the outlet 90 disposed on the tip 92 of the spray nozzle 56 may be directed to the first axial position 100 and the two spray nozzles disposed on the downstream surface 96 may be directed toward a second axial position 102. In some embodiments, each spray nozzle 56 around the axis 52 may have the same configuration and arrangement of outlets 90. However, in some embodiments, the spray nozzles 56 around the axis 52 may have different configurations and arrangements of the outlets 90 about the surfaces (e.g., the tip, 92, the upstream surface 94, and the downstream surface 96) of the spray nozzle 56. Further, in some embodiments, the outlets 90 may be flush with the surfaces of the spray nozzles 56, the outlets 90 may be recessed beneath the outer surfaces of the spray nozzles 56, or the outlets 90 may extend from the surfaces of the spray nozzles 56.

The fluid supply system 34 may supply the fluid to the outlets 90 of the spray nozzles 56 via the fluid supply line 40, the manifold 80, and the nozzle supply lines 82. In some embodiments, the nozzle supply lines 82 may supply all of the outlets 90 of a spray nozzle 56, such that when a spray nozzles 56 is in use, all of its respective outlets 90 are spraying the fluid spray 66. In some embodiments, the outlets 90 of the spray nozzle 56 may be supplied separately. The nozzle supply lines 82 may direct the fluid to one or more outlets 90 of the spray nozzle 56, such that there may be more than one nozzle supply line 82 directing the fluid to a spray nozzle 56. Supplying the outlets 90 of a spray nozzle 56 separately may enable a selection of not only spray nozzles 56 that may be used at a time, but also a selection of the outlets 90 of a spray nozzle 56 that may be used at a time. This in turn may enable a greater distribution of the fluid spray 66 in the axial direction 52 of the compressor 20 at the compressor blades 68, which may increase the water wash efficiency and recovery of power from the gas turbine system 10.

Multiple outlets 90 on each spray nozzle 56 may enable a reduction in the pressure of the supplied fluid while maintaining a desired flow rate of the fluid and mitigating the previously mentioned forces acting on the intake air flow 18 and the fluid spray 66. For example, the pressure of the wash fluid supplied to the spray nozzles 56 may be reduced to 120 psi, 80 psi, 60 psi, or any pressure in between while maintaining a desired flow rate of the fluid. Further, multiple outlets 90 may enable an increase in the coverage of the blades 68 of the compressor 20 that is interfaced by the fluid spray 66 from the multiple outlets 90. For example, in some embodiments, the fluid spray 66 from the multiple outlets 90 may interface with the whole length 70 of the R1 blade. Multiple outlets 90 may further enable an increased distribution of the relatively larger size droplets (e.g., 85-111 micro meters) at the blades 68 of the compressor 20. Thus, multiple outlets 60 on the spray nozzle 56 may enable an increase in the washed portion 69 of the length 70 of the blades 68 that may interface with the fluid spray 66 and the relatively larger size droplets to greater than 85%. In turn, this may enable an increase in water wash effectiveness and power recovery in the compressor 20.

Figure 5:
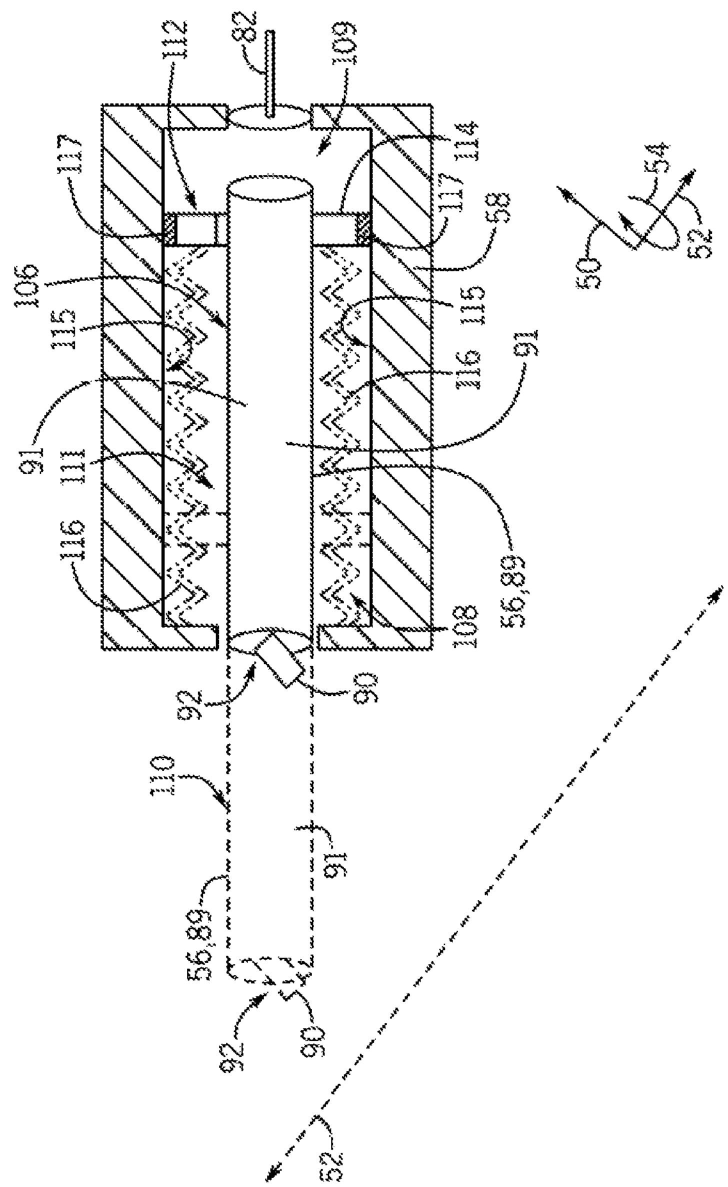
FIG. 5 is a schematic diagram of an embodiment of a retractable spray nozzle of the fluid distribution system of FIG. 2, in accordance with an embodiment of the present disclosure.

FIG. 5 is a schematic diagram of an embodiment of a retractable spray nozzle 56 (e.g., retractable spray nozzle 56, 89) that may be employed within the fluid distribution system 32. In some embodiments, one or more of the spray nozzles 56 of the fluid distribution system 32 may be retractable spray nozzles 89 that may be extended into the path of the intake air flow 18 from the bell mouth 58 of the compressor 20 during water wash procedures. The retractable spray nozzles 89 may be retracted back out of the path of the intake air flow 18 once a desired spray (e.g., water wash) has been achieved. The retractable spray nozzle 89 may be disposed within the bell mouth 58 or at any other location suitable for extension into the path of the intake air flow 18 at or adjacent to the bell mouth 58. In some embodiments, one or more of the spray nozzles 56 of the fluid distribution system 32 may be retractable spray nozzles 89. In some embodiments, the spray nozzle 56 may have a retracted position 106 in which the retractable spray nozzle 89 is within a cavity 108 (e.g., 75-100% of nozzle body 91 within cavity 108). The cavity 108 may be located within the bell mouth 58 at the inlet to the compressor 20 or at any other suitable location about the inlet casing of the compressor 20. Further, in some embodiments, the retractable spray nozzle 89 may have an extended position 110 (e.g., 75-100% of nozzle body 91 extension) in which the spray nozzle 56 is extended from the cavity 108, such that it is extended into a position in the path of the intake air flow 18. In some embodiments, the retractable spray nozzle 89 may have positions between the retracted position 106 and the extended position 110, such that the retractable spray nozzle 89 may be extended to variable lengths, such as 25% extension, 50% extension, and 75% extension. Variable extension levels of the retractable spray nozzles 89 may help enable an increased distribution of the relatively large sized droplets from the one or more outlets 90 of the retractable spray nozzle 89 toward the blades 68 of the compressor 20.

The cavity 108 may have a reservoir portion 109 and a movement portion 111. The reservoir portion 109 may be the portion of the cavity 108 behind the retractable spray nozzle

89 that is filled to force the retractable spray nozzle 89 into the extended position 110. The movement portion 111 of the cavity 108 may contain springs 116, or any other retraction mechanism, and may not be filled during extension of the retractable spray nozzle 89. Further, the movement portion 111 may contain the body 91 of the retractable spray nozzle 89 when the retractable spray nozzle 89 is in the retracted position 106. The reservoir portion 109 and the movement portion 111 of the cavity 108 may be separated by a nozzle plunger 114. There may be a seal 117 between the nozzle plunger 114 and the walls 115 of the cavity 108 to keep the fluid used for extension of the retractable spray nozzle 89 within the reservoir portion 109 and not within the movement portion 111.

One or more mechanisms may be employed in the retractable spray nozzles 89 move the retractable spray nozzle 89 from the retracted position 106 to the extended position 110, and back to the retracted position 106. In some embodiments, the spray nozzle 56 may be moved from the retracted position 106 to the extended position 110 outside of the cavity 108 by the fluid supplied by the fluid supply system 34. That is, the fluid intended for the fluid spray 66 into the intake air flow 18 may hydraulically control the retractable spray nozzle 89 between the retracted position 106 and the extended position 110. The fluid from the fluid supply system 34 may be directed from the fluid supply system to the fluid supply line 40, to the manifold 80, and to the nozzle supply line 82. The nozzle supply line 82 may direct the fluid into the reservoir portion 109 of the cavity 108 and into the body 91 of the retractable spray nozzle 89. The fluid pressure (e.g., 60-120 psi) may push against a fluid side 112 of a nozzle plunger 114 within the reservoir portion 109 of the cavity 108, thus causing the spray nozzle 56 to be pushed out of the cavity 108 and into the extended position 110. The fluid may further be directed into the retractable spray nozzle 89 and its one or more outlets 90 to inject the fluid spray 66 into the intake air flow 18. Once a desired fluid spray 66 has been achieved, the fluid supply from the fluid supply system 34 may be decreased or stopped. The fluid pressure pushing against the fluid side 112 of the nozzle plunger 114 may decrease or stop. In some embodiments, the springs 116 within the movement portion 111 of the cavity 108 may bias the nozzle plunger 114 back into the cavity 108 such that the retracted position 106 of the retractable spray nozzle 89 is the default position.

Retractable spray nozzles 89 enable a decrease in blockage of the flow of the intake air flow 18 during operation of the compressor 20 in modes other than the water wash mode. That is, the retractable spray nozzles 89 may only be extended when water wash procedures are being performed. In the illustrated embodiment, only one outlet 90 is shown at the tip 92 of the spray nozzle 56 for clarity of the extended position 110 and the retracted position 106. However, as previously discussed, the spray nozzle 56 may include any quantity (e.g., 2, 3, 4, 5, or more) outlets 90 that may be disposed on any of the surfaces (e.g., the tip 92, the upstream surface 94, and the downstream surface 96) of the spray nozzle 56. Additionally or alternatively, other mechanisms, such as an actuation fluid (e.g. the wash fluid, a fluid other than the wash fluid), pneumatic air, electrical motor, levers, or any other mechanisms, may be employed in the fluid distribution system 32 to move the spray nozzle 56 from the retracted position 106 to the extended position 110, and back to the retracted position 106, as discussed in greater detail with reference to FIGS. 6 and 7.

Figure 6:
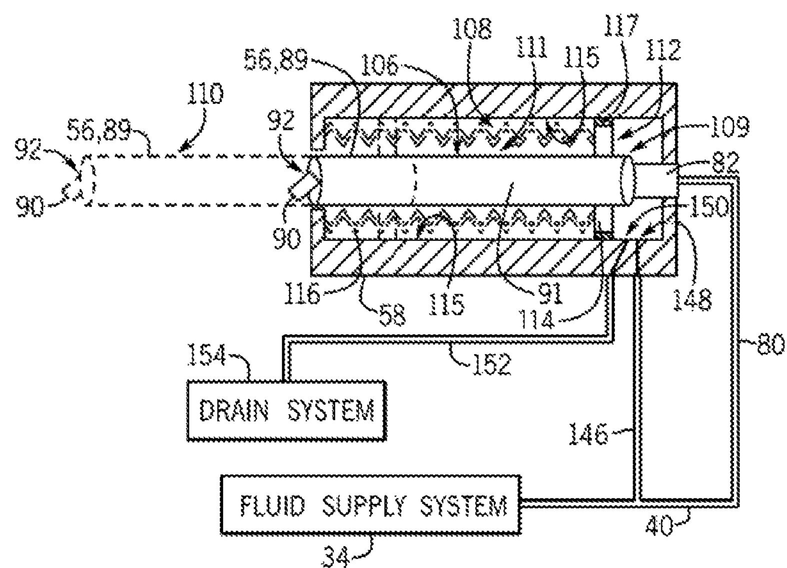
FIG. 6 is a schematic diagram of an embodiment of an extension mechanism for the retractable spray nozzle of FIG. 5, in accordance with an embodiment of the present disclosure.

FIG. 6 a schematic diagram of an embodiment of another extension mechanism for the retractable spray nozzle 89 of FIG. 5. In some embodiments, a fluid may be used to extend the retractable spray nozzle 89 into the extended position 110. In some embodiments, the fluid used for extension may be supplied from the fluid supply system 34, as in the illustrated embodiment. However, in some embodiments, the fluid used for extension may be supplied from a separate fluid supply. The fluid supply system 34 may supply the fluid to the fluid supply line 40. The fluid supply line 40 may be coupled to a fluid extension line 146. In some embodiments, the fluid extension line 146 may branch from the fluid supply line 40 upstream of the manifold 80. However, in some embodiments, the fluid extension line 146 may be coupled to the manifold 80. The fluid extension line 146 may direct the fluid to the reservoir portion 109 of the cavity 108. The fluid may enter the reservoir portion 109 of the cavity 108 via a fluid inlet 148. Fluid pressure created by the fluid entering from the fluid extension line 146 may push against the fluid side 112 of the nozzle plunger 114 and may cause the retractable spray nozzle 89 to be pushed out of the cavity 108 and into the extended position 110 such that the retractable spray nozzle 89 is extended into the path of the intake air flow 18. The fluid supplied by the fluid supply system 34 may also be supplied to the spray nozzle 56 via the fluid supply line 40, the manifold 80, and the nozzle supply line 82. The nozzle supply line 82 may direct the fluid into the body 91 of the retractable spray nozzle 89 itself, such that the fluid (e.g., water, water with detergent) supplied by the nozzle supply line 82 may not mix with the fluid (e.g., water, oil) supplied to the reservoir portion 109 of the cavity 108 by the fluid extension line 146. From the nozzle supply line 82, the fluid may be directed to the one or more outlets 90 of the retractable spray nozzle 89 in the extended position 110. In some embodiments, once the desired water wash is achieved, the fluid supply system 34 may stop supplying fluid to the fluid supply line 40 and the fluid extension line 146. The fluid in the cavity 108 supplied by the fluid extension line 146 may exit the cavity 108 via an exit channel 150. The exit channel 150 may direct the fluid from the reservoir portion of the cavity 108 into a drain line 152. The drain line 152 may direct the fluid to a drain system 154. As the fluid exits the reservoir portion 109 of the cavity 108 via the exit channel 150 and the drain line 152, the force of the springs 116 within the movement portion 111 of the cavity 108 may push the nozzle plunger 114 back such that the retractable spray nozzle 89 is moved to the retracted position 106 within the cavity 108.

In some embodiments, the fluid extension line 146 may direct the fluid to all of the retractable spray nozzles 89 of the fluid distribution system 32. However, in some embodiments, each retractable spray nozzle 89 or a group of retractable spray nozzles 89 may be supplied by different fluid extension lines 146, which may enable a selection of the retractable spray nozzles 89 that may be extended to the extended position 110 at a time. Having retractable spray nozzles 89 may enable a decrease in blockage of the flow of the intake air flow 18 as the retractable spray nozzles 89 may only extend when water wash procedures are being performed. In the illustrated embodiment, only one outlet 90 is shown at the tip 92 of the retractable spray nozzle 89 for clarity of the extended position 110 and the retracted position 106. However, as previously discussed, the retractable spray nozzles 89 may include any quantity (e.g., 2, 3, 4, 5, or more) of outlets 90 that may be disposed on any of the surfaces (e.g., the tip 92, the upstream surface 94, and the downstream surface 96) of the spray nozzle 56.

Figure 7:
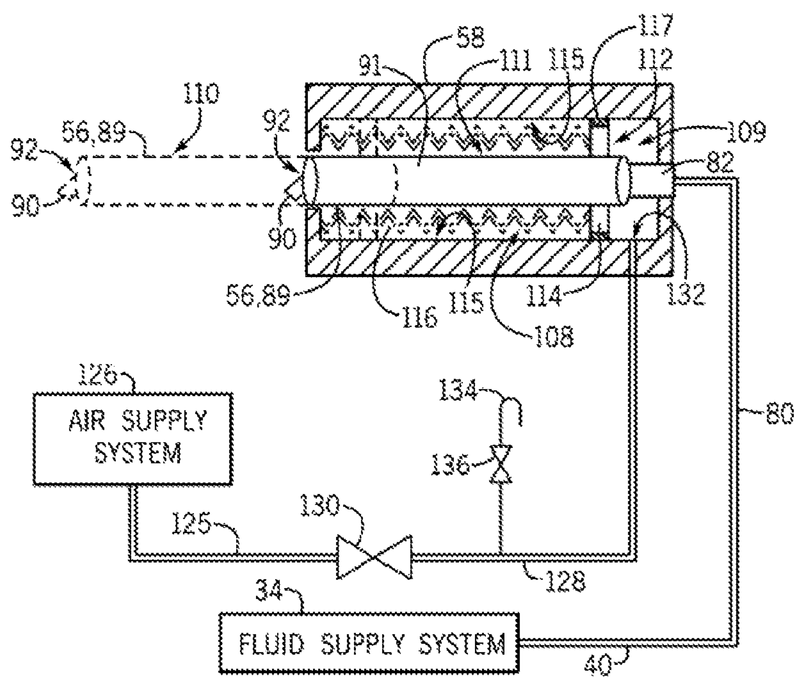
FIG. 7 is a schematic diagram of an embodiment of an extension mechanism for the retractable spray nozzle of FIG. 5, in accordance with and embodiment of the present disclosure.

FIG. 7 a schematic diagram of an embodiment of another extension mechanism, such as air, for the retractable spray nozzle 89 of FIG. 5. In some embodiments, a pneumatic system (e.g. compressed air) may be used to control the retractable spray nozzle 89 between the extended position 110 and the retracted position 106. Compressed air 125 may be supplied from the compressor 20, an air supply system 126, or any combination thereof. The air supply system 126 may supply the compressed air 125 to an air supply line 128. The air supply line 128 may direct the compressed air 125 from the air supply system 126 to the cavity 108 to extend the spray nozzle 56. In some embodiments, there may be a valve 130 along the air supply line 128 that may be used to regulate the flow of compressed air 125 to the cavity 108. The air 125 may enter the reservoir portion 109 of the cavity 108 at an inlet 132 that may be disposed such that the compressed air 125 may push on the fluid side 112 of the nozzle plunger 114. The air supply system 126 may direct compressed air 125 to the reservoir portion 109 of the cavity 108 along the air supply line 128 when the valve 130 is open. Air pressure created by the compressed air 125 entering from the air supply line 128 may push against the fluid side 112 of the nozzle plunger 114 and may cause the retractable spray nozzle 89 to be pushed out of the cavity 108 and into the extended position 110 such that the retractable spray nozzle 89 is may be extended into the path of the intake air flow 18. While the compressed air 125 is supplied to the reservoir portion 109 of the cavity 108 to push the retractable spray nozzle 89 into the extended position 110, the wash fluid may be supplied to the retractable spray nozzle 89 and the outlets 90 via the manifold 80 and the nozzle supply line 82. The nozzle supply line 82 may extend from the manifold 80 into the body 91 of the retractable spray nozzle 89, such that the wash fluid does not enter into the reservoir portion 109 of the cavity 108. The air supply system 126 may supply the compressed air 125 to the reservoir portion 109 of the cavity 108 while the fluid is sprayed from the retractable spray nozzle 89 and the retractable spray nozzle 89 is in the extended position 110. In some embodiments, once the desired water wash is achieved, the valve 130 may be closed such that no additional compressed air 125 is supplied to the reservoir portion 109 of the cavity 108 via the air supply line 128. A vent 134 disposed along the air supply line 128 may enable the compressed air 125 remaining in the reservoir portion 109 of the cavity 108 or in the air supply line 128 to exit the air supply line 128. A valve 136 at the opening to the vent 134 may open when water wash procedures are complete. As the air 125 exits the cavity 108 and the air supply line 128, the force of springs 116 within the cavity 108, or any other suitable force, may push the nozzle plunger 114 back such that the spray nozzle 56 is moved to the retracted position 106 within the cavity 108.

In some embodiments, the air supply line 128 may direct air 125 to all of the retractable spray nozzles 89 of the fluid distribution system 32. However, in some embodiments, each retractable spray nozzle 89 or a group of retractable spray nozzles 89 may be supplied by different air supply lines 128, which may enable a selection of the retractable spray nozzles 89 that may be extended to the extended position 110 at a time. Retractable spray nozzles 89 enable a decrease in blockage of the flow of the intake air flow 18 during operation of the compressor 20 in modes other than the water wash mode. That is, the retractable spray nozzles 89 may only be extended when water wash procedures are being performed. In the illustrated embodiment, only one outlet 90 is shown at the tip 92 of the retractable spray nozzle 89 for clarity of the extended position 110 and the retracted position 106. However, as previously discussed, the spray nozzle 56 may include any quantity (e.g., 2, 3, 4, 5, or more) outlets 90 that may be disposed on any of the surfaces (e.g., the tip 92, the upstream surface 94, and the downstream surface 96) of the spray nozzle 56. Additionally or alternatively, other mechanisms may be employed in the fluid distribution system 32 to move the spray nozzle 56 from the retracted position 106 to the extended position 110, and back to the retracted position 106, as discussed in greater detail with reference to FIG. 7.

Technical effects of the disclosed embodiments include a circumferentially disposed fluid distribution system that may distribute a fluid for water wash procedures at or near the bell mouth at the inlet to the compressor of the gas turbine system. The spray nozzles of the fluid distribution system may be circumferentially distributed about the bell mouth at the inlet to the compressor such that the spray nozzles extend into the path of the intake air flow. The one or more spray nozzles may inject a fluid (e.g., water) into the passing intake air flow as it enters the compressor. One or more of the spray nozzles may include multiple outlets that may be disposed on one or more surfaces of the spray nozzle. The circumferential distribution of the spray nozzles and multiple outlets on each spray nozzle may help mitigate the effects of forces (e.g., centrifugal, gravitational) on the fluid droplets. The extension of the spray nozzles into the path of the intake air flow and the multiple outlets on each spray nozzle may increase the fluid droplet distribution in the radial direction at the blades of the compressor. An increase in the fluid droplet distribution at the blades of the compressor may enable a greater portion of the length of the blades to be washed by the fluid droplets and an increase in the effectiveness of the wash. This in turn may enable an increase in the power recovered in the compressor and an increase in the efficiency and output of the gas turbine system.

Further, the spray nozzles and the outlets of the spray nozzles may be supplied with the fluid individually or in groups, which may enable a selection of the spray nozzles or of the outlets that may be used at once. This selection may help enable a greater distribution of the larger size droplets at the blades of the compressor. Still further, one or more of the spray nozzles may be retractable spray nozzles that may be retracted to reduce obstruction of the intake airflow when the compressor operates in modes other than a water wash mode. This may help increase the efficiency of the compressor and the gas turbine system.

This written description uses examples to disclose the concepts discussed herein, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A system comprising:

a fluid distribution system, comprising:

a first water wash nozzle configured to spray a wash fluid into an intake flow received through a bell mouth of a compressor during operation of the compressor in a water wash mode, wherein the first water wash nozzle comprises:

a first inlet end coupled to the bell mouth of the compressor;

a first tip disposed opposite the first inlet end;

a first body of the first water wash nozzle extending lengthwise along a first center axis from the first inlet end to the first tip in a first inward direction toward an axis of the compressor, wherein the first tip comprises a first tip surface at a first distal end of the first body, facing away from the first inlet end, and oriented crosswise to the first center axis;

a first outlet disposed at the first tip surface and configured to spray a first portion of the wash fluid into the intake flow during operation of the compressor in the water wash mode; and a second outlet disposed along the first body and configured to spray a second portion of the wash fluid into the intake flow during operation of the compressor in the water wash mode.

2. The system as claimed in claim 1, wherein the second outlet is disposed on a downstream surface of the first body of the first water wash nozzle, wherein the downstream surface is directed toward an inlet of the compressor.

3. The system as claimed in claim 1, wherein the fluid distribution system comprises a second water wash nozzle configured to spray the wash fluid into the intake flow received through the bell mouth of the compressor during operation of the compressor in a water wash mode, wherein the second water wash nozzle comprises:

a second inlet end coupled to the bell mouth of the compressor;

a second tip disposed opposite the second inlet end;

a second body of the second water wash nozzle extending lengthwise along a second center axis from the second inlet end to the second tip in a second inward direction toward the axis of the compressor, wherein the second tip comprises a second tip surface at a second distal end of the second body, facing away from the second inlet end, and oriented crosswise to the second center axis;

a third outlet disposed at the second tip surface and configured to spray a third portion of the wash fluid into the intake flow during operation of the compressor in the water wash mode; and a fourth outlet disposed along the second body and configured to spray a fourth portion of the wash fluid into the intake flow during operation of the compressor in the water wash mode.

4. The system as claimed in claim 1, wherein the first portion and the second portion of the wash fluid sprayed from the first water wash nozzle comprise a water wash coverage of a first stage of the compressor that is greater than 85 percent of a span of the first stage of the compressor, and an average droplet size of the first portion and the second portion of the wash fluid sprayed from the first water wash nozzle is less than 111 micro meters.

5. The system as claimed in claim 1, wherein the first water wash nozzle comprises a third outlet disposed along the first body and configured to spray a third portion of the wash fluid into the intake flow during operation of the compressor in the water wash mode.

6. The system as claimed in claim 1, wherein the first water wash nozzle is a retractable water wash nozzle configured to extend from the bell mouth in an extended position during operation of the compressor in the water wash mode, and configured to retract into the bell mouth in a retracted position during operation of the compressor in other modes.

7. The system as claimed in claim 6, wherein the retractable water wash nozzle is configured to be actuated to move to a plurality of extension levels to change positions for spraying the wash fluid during the water wash mode.

8. The system as claimed in claim 6, wherein the fluid distribution system comprises a fluid supply system coupled to the retractable water wash nozzle, wherein the fluid supply system is configured to supply an actuation fluid to the retractable water wash nozzle to control the retractable water wash nozzle between the extended position and the retracted position, wherein the actuation fluid is different from the wash fluid.

9. The system as claimed in claim 8, wherein the actuation fluid comprises a liquid or a gas, the retractable water wash nozzle has an airfoil shaped body as the first body, and the second outlet is disposed along a downstream surface of the airfoil shaped body.

10. A system comprising:

a fluid distribution system, comprising:

a plurality of water wash nozzles disposed about a bell mouth of a compressor, wherein the plurality of water wash nozzles is configured to spray a wash fluid into an intake flow received through the bell mouth during operation of the compressor in a water wash mode, wherein each water wash nozzle of the plurality of water wash nozzles comprises:

an inlet end coupled to the bell mouth of the compressor;

a tip disposed opposite the inlet end;

an airfoil shaped body extending lengthwise along a center axis from the inlet end to the tip in an inward direction toward an axis of the compressor; and a plurality of outlets protruding outwardly from the airfoil shaped body and/or the tip, wherein each outlet of the plurality of outlets is configured to spray a portion of the wash fluid into the intake flow during operation of the compressor in the water wash mode.

11. The system as claimed in claim 10, wherein the plurality of outlets comprises a first outlet disposed on a tip surface of the tip and a second outlet disposed along a downstream surface of the airfoil shaped body of each water wash nozzle of the plurality of water wash nozzles, wherein the tip surface is disposed at a distal end of the airfoil shaped body, facing away from the inlet end, and oriented crosswise to the center axis, wherein the downstream surface is directed toward an inlet of the compressor.

12. The system as claimed in claim 10, wherein the portion of the wash fluid sprayed from the plurality of water wash nozzles comprises a water wash coverage of a first stage of the compressor that is greater than 85 percent of a span of the first stage of the compressor, and wherein the wash fluid is supplied to the plurality of water wash nozzles at between 60 to 120 psi (413,685 to 827,371 Pa).

13. The system as claimed in claim 10, wherein each nozzle of the plurality of water wash nozzles is a retractable water wash nozzle configured to extend from the bell mouth in an extended position during operation of the compressor in the water wash mode, and configured to retract into the bell mouth in a retracted position during operation of the compressor in other modes, wherein the retractable water wash nozzle is configured to be actuated to move between the extended position and the retracted position independent from the wash fluid supplied to the plurality of water wash nozzles.

14. The system as claimed in claim 13, wherein the retractable water wash nozzle is configured to be actuated to move to a plurality of extension levels to change positions for spraying the wash fluid during the water wash mode.

15. The system as claimed in claim 10, wherein the airfoil shaped body of each water wash nozzle of the plurality of water wash nozzles is between 4 to 10 inches long (101.6 to 254 mm).

16. The system as claimed in claim 13, wherein the retractable water wash nozzle is configured to be actuated by an electric actuator.

17. A system comprising:

a fluid distribution system, comprising:

a plurality of retractable water wash nozzles configured to spray a wash fluid into an intake flow received through a bell mouth of a compressor during operation of the compressor in a water wash mode, wherein the plurality of retractable water wash nozzles is disposed circumferentially about an axis of the compressor, and each retractable water wash nozzle of the plurality of retractable water wash nozzles is coupled to the bell mouth of the compressor, wherein each retractable water wash nozzle of the plurality of retractable water wash nozzles is configured to extend from the bell mouth in an extended position during operation of the compressor in the water wash mode, and is configured to retract into the bell mouth in a retracted position during operation of the compressor in other mode, wherein each retractable water wash nozzle of the plurality of retractable water wash nozzles is configured to be actuated to move between the extended position and the retracted position independent from the wash fluid supplied to the plurality of retractable water wash nozzles.

18. The system as claimed in claim 17, wherein the fluid distribution system comprises a fluid supply system coupled to the plurality of retractable water wash nozzles, wherein the fluid supply system is configured to supply an actuation fluid to the plurality of retractable water wash nozzles to control the plurality of retractable water wash nozzles between the extended position and the retracted position, wherein the actuation fluid is different from the wash fluid.

19. The system as claimed in claim 17, wherein each retractable water wash nozzle of the plurality of retractable water wash nozzles comprises:

an inlet end coupled to the bell mouth of the compressor;

a tip disposed opposite the inlet end;

a body of the respective retractable water wash nozzle extending lengthwise along a center axis from the inlet end to the tip in an inward direction toward the axis of the compressor, wherein the tip comprises a tip surface at a distal end of the body, facing away from the inlet end, and oriented crosswise to the center axis;

a first outlet disposed at the tip surface and configured to spray a first portion of the wash fluid into the intake flow during operation of the compressor in the water wash mode; and a second outlet disposed along the body and configured to spray a second portion of the wash fluid into the intake flow during operation of the compressor in the water wash mode.

20. The system as claimed in claim 19, wherein the body of the each retractable water wash nozzle comprises a downstream surface directed toward an inlet of the compressor, and the second outlet of each retractable water wash nozzle is disposed on the downstream surface of the respective body of the respective retractable water wash nozzle.

21. The system as claimed in claim 17, wherein each retractable water wash nozzle of the plurality of retractable water wash nozzles is configured to be actuated to move to a plurality of extension levels to change positions for spraying the wash fluid during the water wash mode.

* * * * *